(12) United States Patent
Chang et al.

(10) Patent No.: US 6,215,909 B1
(45) Date of Patent: *Apr. 10, 2001

(54) METHOD AND SYSTEM FOR IMPROVED DIGITAL VIDEO DATA PROCESSING USING 4-POINT DISCRETE COSINE TRANSFORMS

(75) Inventors: Ching-Fang Chang, San Jose; C. C. Lee, Fremont; Naofumi Yanagihara, Tokyo, all of (JP)

(73) Assignees: Sony Electronics, Inc., Park Ridge, NJ (US); Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/971,904

(22) Filed: Nov. 17, 1997

(51) Int. Cl.$^7$ ...................................................... G06K 9/36
(52) U.S. Cl. ............................................................ 382/250
(58) Field of Search ................................... 382/250, 248, 382/232, 233; 358/432

(56) References Cited

U.S. PATENT DOCUMENTS

| | | | |
|---|---|---|---|
| 4,385,363 | * 5/1983 | Widergren et al. | 364/725 |
| 4,845,560 | 7/1989 | Kondo et al. | 358/133 |
| 5,341,318 | * 8/1994 | Balkanski et al. | 364/725 |
| 5,543,932 | 8/1996 | Chang et al. | 358/335 |
| 5,566,190 | 10/1996 | Hattori | 371/37.1 |
| 5,574,661 | 11/1996 | Cismas | 364/514 R |
| 5,594,679 | 1/1997 | Iwata | 364/736 |
| 5,636,152 | 6/1997 | Yang et al. | 364/725 |
| 5,642,438 | 6/1997 | Babkin | 382/250 |
| 5,880,787 | * 3/1999 | Takashima et al. | 348/416 |

OTHER PUBLICATIONS

C. Loeffler et al., "Practical Fast 1–D DCT Algorithms with 11 Multiplications," IEEE, 1989, pp. 988–991, 1989.*

"Specifications of Consumer—Use of Digital VCRs Using 6.3 mm Magnetic Tape," HD Digital VCR Conf, Dec. 1994, pp. 23–32.*

C. Yamamitsu et al., "An Experimental Study for a Home–Use Digital VTR," IEEE Transactions on Consumer Electronics, vol. 35, No. 3, Aug. 1989, pp. 450–456.

C. Loeffler et al., "Practical Fast 1–D DCT Algorithms With 11 Multiplications," IEEE, 1989, pp. 988–991.

"Specifications of Consumer–Use of Digital VCRs Using 6.3mm Magnetic Tape," HD Digital VCR Conference, Dec. 1994, pp. 23–32.

* cited by examiner

Primary Examiner—Leo H. Boudreau
Assistant Examiner—Paul H. Schirduan
(74) Attorney, Agent, or Firm—Finnegan, Henderson, Farabow, Garrett & Dunner, L.L.P.

(57) ABSTRACT

Methods and systems for data compression and decompression are disclosed. Specifically, the method for data compression of the present invention receives four inputs representing pixel information of an image and performs a combination of a 4-point discrete cosine transform (DCT) and a weighting function to obtain four outputs representing digital representations of an image. The method for data decompression receives four inputs representing digital representations of an image and performs a combination of an inverse weighting function and a 4-point inverse discrete cosine transform (IDCT) to obtain pixel components of an image. The methods and systems of the present invention may be used in optimizing digital video encoders and decoders.

36 Claims, 7 Drawing Sheets

METHOD AND SYSTEM FOR IMPROVED DIGITAL VIDEO DATA PROCESSING USING 4-POINT DISCRETE COSINE TRANSFORMS

BACKGROUND OF THE INVENTION

The present invention relates generally to methods and apparatus for data compression and decompression, and in particular, is directed to methods and systems for performing the discrete cosine transform (DCT) and weighting processes of a digital video encoder and the inverse weighting and inverse discrete cosine transform (IDCT) processes of a digital video decoder.

Digital video is the term used to describe video signals represented in digital form. Digital video offers several advantages over traditional analog systems. For example, recordings of digital video signals can be copied indefinitely without significant loss of quality. Also, compressed digital video signals may require less storage space than analog recordings for the same or better picture quality. Finally, digital formats allow audio, video, and other data to be easily combined, edited, stored, and transmitted.

A direct conversion into digital format of analog video signals having fast frame rates, many colors, and high resolution, however, results in digital video signals with a high data rate, creating difficulties for storage and transmission. Many digital video systems, therefore, reduce the amount of digital video data by employing data compression techniques that are optimized for particular applications. Digital compression devices are commonly referred to as encoders; devices that perform decompression are referred to as decoders. Devices that perform both encoding and decoding are referred to as codecs.

The "DV" format is an industry digital video format specification for use primarily in consumer-level video tape recorders VTRs). The specification for DV format has been adopted by most of the major manufacturers of high-quality digital video cassette recorders (DVCRs) and digital video camcorders. See Specifications of Consumer-Use Digital VCRs, HD Digital VCR Conference, December 1994. The DV format is currently used in such commercially available products as digital camcorders.

Video displays have traditionally consisted of a series of still pictures, or "frames", painted by scan lines and sequentially displayed at a rate of, for example, thirty frames per second to provide the illusion of continuous motion. Each frame consists of a pair of interlaced "fields." A field contains half the number of lines of a frame. Fields are interleaved with lines from either a previous or subsequent field to create a frame. When storing or transmitting video data, the amount of data may be reduced by taking advantage of redundancy within fields (intrafield) or between neighboring fields (interfield). DV format uses both intrafield and interfield data reduction.

FIG. 1 is a basic flow diagram showing the encoding, or data compression, process of a prior art digital video codec. Codecs employing DV format use a DCT-based data compression method. In the blocking step, the image frame is divided into N by N blocks of pixel information including, for example, brightness and color data for each pixel (Step 100). A common block size is eight pixels horizontally by eight pixels vertically. The pixel blocks are then "shuffled" so that several blocks from different portions of the image are grouped together (Step 110). Shuffling enhances the uniformity of image quality.

Different fields are recorded at different time incidents. If a video scene contains a large amount of motion, the two fields within a frame contain significantly different image information, and DV encoders use an intrafield data reduction process to remove redundancy within a field.

In video images without substantial motion, the two fields of a frame contain similar image information, and DV encoders use an interfield data reduction process to remove redundancy between fields. For each block of pixel data, a motion detector looks for the difference between two fields of a frame (Step 115). The motion information is sent to the next processing step (Step 120).

In step 120, pixel information is transformed using a DCT. There are at least two common DCT modes: 8—8 DCT mode and 2-4-8 DCT mode. The 8—8 DCT mode refers to a DCT that takes eight inputs and returns 8 outputs in both vertical and horizontal directions. In the 2-4-8 DCT mode, an 8 by 8 block of data is divided into two 4 by 8 fields, each field consisting of 4 horizontal lines of 8 components. A two-dimensional 4 by 8 transform is performed on each field, each 4×8 transform consisting of a one-dimensional transform taking 4 inputs and returning 4 outputs in the vertical direction, and a one-dimensional transform taking 8 inputs and returning 8 outputs in the horizontal direction. The DV format specification recommends that the 8—8 DCT mode be used when the difference between two fields is small. By contrast, the 24–8 DCT mode should be used when two fields differ greatly.

In the 2-4-8 DCT mode, 8×8 blocks of pixel information are divided into two 4×8 blocks of pixel information. The first block represents the sums the rows; the second block represents the differences of the rows. Each 4× 8 block is transformed into a 4×8 matrix of corresponding frequency coefficients using a two-dimensional DCT. In the following equations, P(x,y) represents an input block of pixel information with symbols x and y representing pixel coordinates in the DCT block. Q'(h,v) represents the resulting output block of DCT coefficients for the sum information and Q'(h,v+4) represents the output block of DCT coefficients on the difference information. The DCT in the 2×4×8 mode may be described mathematically as follows:

For h=0, 1, . . . 7 and v=0, 1, . . . 3, $$Q'(h, v) = C(h)C(v) \sum_{m=0}^{3} \sum_{x=0}^{7} (P(x, 2m) + P(x, 2m+1)) \cos\left(\frac{\pi h(2x+1)}{16}\right) \cos\left(\frac{\pi v(2m+1)}{8}\right)$$

$$Q'(h, v+4) = C(h)C(v) \sum_{m=0}^{3} \sum_{x=0}^{7} (P(x, 2m) - P(x, 2m+1)) \cos\left(\frac{\pi h(2h+1)}{16}\right) \cos\left(\frac{\pi v(2m+1)}{8}\right)$$

where $$C(h) = \begin{cases} \frac{1}{2\sqrt{2}}, & h = 0 \\ \frac{1}{2}, & h = 1 \text{ to } 7 \end{cases}$$

and $$C(v) = \begin{cases} \frac{1}{2\sqrt{2}}, & v = 0 \\ \frac{1}{2}, & v = 1 \text{ to } 7 \end{cases}$$

The DCT coefficients are then weighted by multiplying each block of DCT coefficients by weighting constants (Step 124). This process may be described mathematically as follows:

$$Q(h, v) = W(h, v) Q'(h, v)$$

The following weighting coefficients are standard for the DV format.

$$W(h, v) = \begin{cases} \frac{1}{4}, & h = 0, v = 0 \\ \frac{(w(h)w(2v))}{2}, & 0 < v < 4 \\ \frac{(w(h)w(2(v-4)))}{2}, & 4 \leq v < 7 \end{cases}$$

re w(0)=1
   w (1)=CS4/(4×CS7×CS2)
   w (2)=CS4/(2×CS6)
   w (3)=1/(2×CS5)
   W(4)=7/8
   w(5)=CS4/CS3
   w (6)=CS4/CS2
   w (7) =CS4/CS1 and CSm =COS (mII/16).

The weighted DCT coefficients, Q(h,v), are stored to a buffer (Step 125).

The weighted DCT coefficients are quantized in the next step (Step 140). Quantization increases the efficiency of video data transmission, but may result in error propagation. To reduce the magnitude of errors, each DCT block is classified into one of four activity classes described in the DV format specification (Step 130). The four classes represent four different quantizing schemes. The amount of data in the variable length codeword using each quantizer is estimated (Step 135) and the quanfizer that best will compress one or more successive weighted DCT coefficients into a same size block as a synchronization block is selected.

Quantization rounds off each DCT coefficient within a certain range of values to be the same number (Step 140). Quantizing tends to set the higher frequency components of the frequency matrix to zero, resulting in much less data to be stored. Since the human eye is most sensitive to lower frequencies, however, very little perceptible image quality is lost by this step.

Quantization step 140 includes converting the two-dimensional matrix of quantized coefficients to a one-dimensional linear stream of data by reading the matrix values in a zigzag pattern and dividing the one-dimensional linear stream of quantized coefficients into segments, where each segment consists of a string of zero coefficients followed by a non-zero quantized coefficient. Variable length coding (VLC) then is performed by transforming each segment, consisting of the number of zero coefficients and the amplitude of the non-zero coefficient in the segment, into a variable length codeword (Step 145). Finally, a framing process packs every 30 blocks of variable-length coded quantized coefficients into five fixed-length synchronization blocks (Step 150).

FIG. 2 shows a basic flow diagram of a prior art DV codec decoding process. Decoding is essentially the reverse of the encoding process described above. The digital stream is first deframed (Step 200). Variable length decoding (VLD) then unpacks the data so that it may be restored to the individual coefficients (Step 210).

After inverse quantizing the coefficients (Step 220), inverse weighting (Step 230) and an inverse discrete cosine transform (IDCT) (Step 235) are applied to the result. The inverse weights W(h,v) are the multiplicative inverses of the weights W'(h,v) that were applied in the encoding process. The inverse weighting process may be described mathematically as follows, where Q(h,v) represents the input coefficients.

$$Q'(h, v) = W(h,v) Q(h, v)$$

The following inverse weighting coefficients are standard for the DV format.

$$W'(h, v) = \begin{cases} 4 & h = 0, v = 0 \\ 2/(w(h)w(2v)), & v < 4 \\ 2/(w(h)w(2(v-4))), & 4 \leq v < 7 \end{cases}$$

where
   w (0)=1
   w (1)=CS4/ (4×CS7×CS2)
   w (2)=CS4/ (2×CS6)
   w (3)=11(2×CS5)
   w (4)=7/8
   w (5)=CS4/CS3
   w (6)=CS4/CS2
   w (7)=CS4/CS1
   where CSm=COS (mII/16).

The output, Q'(h,v), of the inverse weighting function is then processed by the IDCT. The IDCT process is described mathematically as follows:

If y=2m, then for m=0, 1 . . . 3, and x=0, 1, . . . 7, $$P(x, y) = P(x, 2m) = \sum_{v=0}^{3} \sum_{h=0}^{7} (C(v)C(h)(Q'(h, v) + Q'(h, v+4)) \cos\left(\frac{\pi v(2m+1)}{8}\right) \cos\left(\frac{\pi h(2x+1)}{16}\right)$$

Also, if y=2m+1, then for m=0, 1 . . . 3, and x =0, 1, . . . 7, $$P(x, y) = P(x, 2m+1) = \sum_{v=0}^{3} \sum_{h=0}^{7} (C(v)C(h)(Q'(h, v) - Q'(h, v+4)) \cos\left(\frac{\pi v(2m+1)}{8}\right) \cos\left(\frac{\pi h(2x+1)}{16}\right)$$

where $$C(h) = \begin{cases} \frac{1}{2\sqrt{2}}, & h = 0 \\ \frac{1}{2}, & h = 1 \text{ to } 7 \end{cases}$$

and $$C(v) = \begin{cases} \frac{1}{2\sqrt{2}}, & v = 0 \\ \frac{1}{2}, & v = 1 \text{ to } 7 \end{cases}$$

The result is then deshuffled (Step 240) and deblocked (Step 250) to form the full image frame.

There has been much emphasis on producing efficient implementations of DCT-based data compression and decompression techniques. U.S. Pat. No. 4,385,363 to Widergren et al., for example, discloses a DCT processor for transforming 16 by 16 pixel blocks. The five-stage process described in the '363 patent is optimized for a hardware implementation using 16 inputs and is not readily adaptable for four inputs, nor is it efficient when implemented using software.

U.S. Pat. No. 5,574,661 to Cismas describes an apparatus and method for calculating an inverse discrete cosine transform. The '661 patent discloses primarily a hardware implementation in which the process of performing the IDCT on 8 inputs requires only one multiplier. Neither the '363 patent nor the '661 patent discuss combining the weighting and transform processes. Furthermore, neither of these patents are easily extensible to applications intended for the DV format.

Some researchers have suggested that combining the weighting and DCT processes together reduces the number of multiplications, thereby increasing the speed of most software and hardware implementations of encoders and decoders. See, e.g., C. Yamamitsu et al., "An Experimental Study for Home-Use Digital VTR," IEEE Transactions on Consumer Electronics, Vol. 35, No. 3, August 1989, pp. 450–456. Yamamitsu et al. discusses combining a sample weighting function with DCT and IDCT processes to produce a "modified DCT" and "modified IDCT," each of which requires fewer multiplications than its two component functions when performed consecutively. The modified DCT and IDCT disclosed in the Yamamitsu et al. paper, however, do not use the standard weights for the DV format.

The traditional way to implement 2-4-8 DCT and weighting or inverse weighting and 2-4-8 IDCT is to use two steps. The weighting and inverse weighting processes each require three multiplications in the vertical direction and seven multiplications in the horizontal direction mul. The 4-point DCT or 4-point IDCT each requires three multiplications. Each 8-point DCT or 8-point IDCT requires eleven multiplications. See, e.g., C. Loeffler et al., "Practical Fast 1-D DCT Algorithms with 11 Multiplications," Proceedings of the IEEE International Conference on Acoustics, Speech, and Signal Processing, ICASSP-89, pp. 988–991, 1989.

The present invention reduces DCT-based compression time and decompression time by providing methods and apparatus for a combined weighting/DCT function of a DV encoder that minimize the number of multiplications. Finally, the present invention provides methods and apparatus for a combined IDCT/inverse weighting function of a DV decoder that minimize the number of multiplications.

SUMMARY OF THE INVENTION

Methods for data compression consistent with this invention consist of receiving a plurality of input components representing pixel information of an image and processing the input components using a combination of DCT and weighting to produce output components representing digital representations of an image. Other methods for data decompression consistent with the present invention consist of receiving input components representing digital representations of an image, and processing the input components using a method that combines the steps of inverse weighting and IDCT to produce output components representing pixel information of an image.

More specifically, a method for data compression performed by a processor, which generates intermediate values, comprises the steps of receiving a plurality of input components representing pixel components of an image; determining a first group of intermediate values by combining subsets of the input components; determining a second group of intermediate values by combining a first subset of the input components and the intermediate values; determining a third group of intermediate values by combining a second subset of the input components and the intermediate values with predetermined constants; determining a fourth group of intermediate values by combining a third subset of the input components and the intermediate values; determining output components by combining a fourth subset of the input components and the intermediate values with predetermined constants; and, outputting output components representing digital representations of an image.

A data compression system comprises an input device for receiving a plurality of input components representing pixel information of an image; a first processor for determining a first group of intermediate values by combining subsets of the input components; a second processor for determining a second group of intermediate values by combining a first subset of the input components and the intermediate values; a third processor for determining a third group of intermediate values by combining a second subset of the input components and the intermediate values with predetermined constants; a fourth processor for determining a fourth group of intermediate values by combining a third subset of the input components and the intermediate values; a fifth processor for determining output components by combining a fourth subset of the input components and the intermediate values with predetermined constants; and, an output device for outputting the output components as digital representations of an image.

According to another aspect of the invention, a method for data decompression performed by a processor, which generates intermediate values, comprising the steps of receiving a plurality of input components representing digital representations of an image; determining a first group of intermediate values by combining a subset of the input components with predetermined constants; determining a second group of intermediate values by combining a first subset of the input components and the intermediate values; determining a third group of intermediate values by combining a second subset of the input components and the intermediate value with predetermined constants; determining a fourth group of intermediate values by combining a third subset of the input components and the intermediate values; determining output components by combining a fourth subset of the input components and the intermediate values; and outputting output components representing pixel information of an image.

Furthermore, a data decompression system comprises an input device for receiving a plurality of input components representing digital samples of an image; a first processor for determining a first group of intermediate values by combining a subset of the input components with predetermined constants; a second processor for determining a second group of intermediate values by combining a first subset of the input components and the intermediate values; a third processor for determining a third group of intermediate values by combining a second subset of the input components and the intermediate values with predetermined constants; a fourth processor for determining a fourth group of intermediate values by combining a third subset of the input components and the intermediate values; a fifth processor for determining output components by combining a fourth subset of the input components and the intermediate values; and, an output device for outputting the output components representing pixel components of an image.

BRIEF DESCRIPTION OF THE DRAWINGS

The accompanying drawings, which are incorporated in and constitute a part of this specification, illustrate the invention and, together with the description, serve to explain the principles of the invention.

DESCRIPTION OF THE PREFERRED EMBODIMENTS

Figure 1:
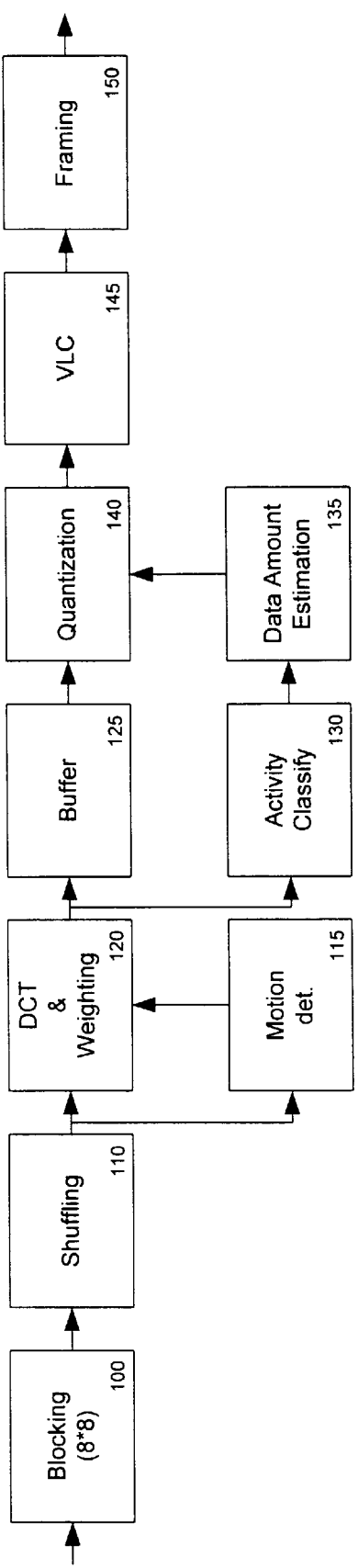
FIG. 1 is a basic flow diagram of a prior art digital video encoder.
Figure 2:
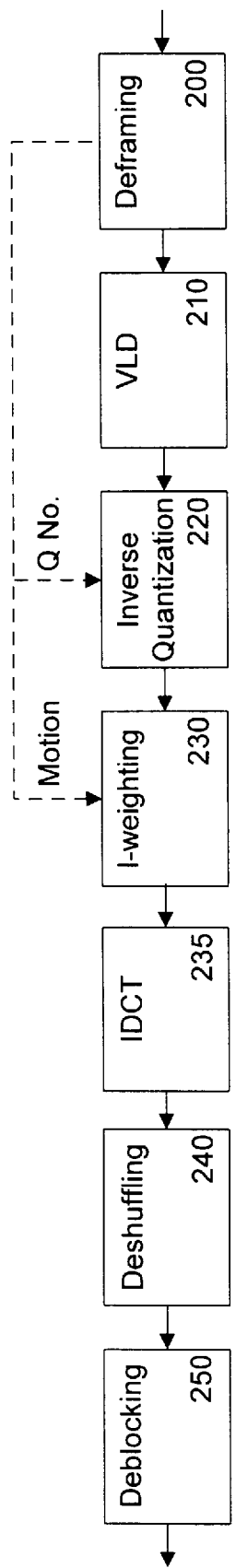
FIG. 2 is a basic flow diagram of a prior art digital video decoder.

Reference will now be made in detail to preferred implementations consistent with the present invention, an example of which is illustrated in the accompanying drawings.

A. Compression

In the 2-4-8 DCT mode, the 8×8 block of pixel information is first divided into two 4×8 blocks. Then, a 4×8 DCT is performed on each 4×8 block. Mathematically, the DCT process may be combined with the weighting process. The standard 2-4-8 DCT equation for DV format is as follows. For h=0, 1, . . . 7 and v=0,1, . . . 3:

$$Q'(h, v) = C(h)C(v)\sum_{m=0}^{3}\sum_{x=0}^{7} (P(x, 2m) + P(x, 2m+1))\text{COS}\left(\frac{\pi h(\pi x + 1)}{16}\right)\text{COS}\left(\frac{\pi v(2m+1)}{8}\right)$$

$$Q'(h, v+4) = C(h)C(v)\sum_{m=0}^{3}\sum_{x=0}^{7} (P(x, 2m) - P(x, 2m+1))\text{COS}\left(\frac{\pi h(2h+1)}{16}\right)\text{COS}\left(\frac{\pi v(2m+1)}{8}\right)$$

where $$C(h) = \begin{cases} \frac{1}{2\sqrt{2}}, & h = 0 \\ \frac{1}{2}, & h = 1 \text{ to } 7 \end{cases}$$

and $$C(v) = \begin{cases} \frac{1}{2\sqrt{2}}, & v = 0 \\ \frac{1}{2}, & v = 1 \text{ to } 7 \end{cases}$$

In the DCT equation above, P(x,y) represents pixel information and is the input to the DCT. In particular, P(x,2m)+P(x,2m+1) indicates that the input to the first DCT is a 4×8 matrix, where each row is the sum of a pair of rows of an 8×8 matrix of pixel information. Similarly, in the second equation, P(x,2m)−P(x,2m+1) indicates that the input to the second DCT is a 4×8 matrix, where each row is the difference of a pair of rows of the 8×8 input matrix of pixel information. Q'(h,v) represents the outputted DCT coefficients that, in a two-step DCT/weighting process, become the input to the weighting function.

The standard weighting function for DV format is defined as:

$$Q(h,v) = W(h,v) Q'(h,v)$$

where Q'(h,v) is the input to the weighting function and Q(h,v) is the outputted weighted coefficients. The weighting constants are as follows:

$$W(h, v) = \begin{cases} \frac{1}{4}, & h = 0, v = 0 \\ \frac{(w(h)w(2v))}{2}, & 0 < v < 4 \\ \frac{(w(h)w(2(v-4)))}{2}, & 4 \le v < 7 \end{cases}$$

where
w (0)=1
w (1)=CS4/(4×CS7×CS2)
w (2)=CS4/(2×CS6)
w (3)=1/(2×CS5)
w (4)=⅞
w (5)=CS4/CS3
w (6)=CS4/CS2
w (7)=CS4/CS1
and CSm =COS (mΠ/16).

If Q"(h,v) is then defined as follows, $$Q''(h, v) = \begin{cases} 2Q(h, v) & h = 0, v = 0 \\ Q(h, v) & \text{others} \end{cases}$$

where Q(h,v) represents the final desired weighted DCT coefficients and Q"(h,v) is an intermediate representation, it is mathematically equivalent to say that:

$$Q''(h, v) = \frac{w(h)w(2v)}{2}C(h)C(v)\sum_{m=0}^{3}\sum_{x=0}^{7}(P(x, 2m) + P(x, 2m+1))\text{COS}\left(\frac{\pi h(2x+1)}{16}\right)\text{COS}\left(\frac{\pi v(2m+1)}{8}\right)$$

$$Q''(h, v+4) = \frac{w(h)w(2v)}{2}C(h)C(v)\sum_{m=0}^{3}\sum_{x=0}^{7}(P(x, 2m) - P(x, 2m+1))\text{COS}\left(\frac{\pi h(2x+1)}{16}\right)\text{COS}\left(\frac{\pi v(2m+1)}{8}\right)$$

If C'(h) and C'(v) are defined as follows $$C'(h) = 2\sqrt{2}\,C(h) = \begin{cases} 1, & h = 0 \\ \sqrt{2}, & h = 1 \text{ to } 7 \end{cases}$$

and $$C'(v) = 2\sqrt{2}\,C(v) = \begin{cases} 1, & v = 0 \\ \sqrt{2}, & v = 1 \text{ to } 7 \end{cases}$$

and substituted for C(h) and C(v), Q"(h,v) and Q"(h,v+4) can be further represented as follows:

$$Q''(h, v) = \frac{1}{16} C'(v) w(2v) \sum_{m=0}^{3} \left\{ \cos\left(\frac{\pi v(2m+1)}{8}\right) \underbrace{[C'(h)w(h) \sum_{x=0}^{7} \cos\left(\frac{\pi h(2x+1)}{16}\right)(P(x, 2m) + P(x, 2m+1))]}_{\text{horizontal 8-point 1-D DCT/weighting of sum information}} \right\}$$

vertical 4-point 1-D DCT/weighting $$Q''(h, v+4) = \frac{1}{16} C'(v) w(2v) \sum_{m=0}^{3} \left\{ \cos\left(\frac{\pi v(2m+1)}{8}\right) \underbrace{[C'(h)w(h) \sum_{x=0}^{7} \cos\left(\frac{\pi h(2x+1)}{16}\right)(P(x, 2m) - P(x, 2m+1))]}_{\text{horizontal 8-point 1-D DCT/weighting of difference information}} \right\}$$

vertical 4-point 1-D DCT/weighting

The equations above are formulas for the combination of the two-dimensional DCT and the weighting function using standard DV format weights. As indicated above, the two-dimensional (2-D) DCT can be performed as two one-dimensional (1-D) processes. In the first equation above, an 8-point 1-D DCT/weighting process is performed first on the horizontal coordinates of sum information. The result is used as input to the 4-point 1-D DCT/weighting process on the vertical coordinates of sum information. In the second equation above, an 8-point 1-D DCT/weighting process is performed first on the horizontal coordinates of difference information. The result is used as input to the 4-point 1-D DCT/weighting process on the vertical coordinates of difference information.

Alternatively, Q"(h,v) and Q"(h,v+4) may be factored as follows:

$$Q''(h, v) = \frac{1}{16} C'(h) w(h) \sum_{x=0}^{7} \left\{ \cos\left(\frac{\pi h(2x+1)}{16}\right) \underbrace{[C'(v)w(2v) \sum_{m=0}^{3} \cos\left(\frac{\pi v(2m+1)}{8}\right)(P(x, 2m) + P(x, 2m+1))]}_{\text{vertical 4-point 1-D DCT/weighting of sum information}} \right\}$$

horizontal 8-point 1-D DCT/weighting $$Q''(h, v+4) = \frac{1}{16} C'(h) w(h) \sum_{x=0}^{7} \left\{ \cos\left(\frac{\pi h(2x+1)}{16}\right) \underbrace{[C'(v)w(2v) \sum_{m=0}^{3} \cos\left(\frac{\pi v(2m+1)}{8}\right)(P(x, 2m) - P(x, 2m+1))]}_{\text{vertical 4-point 1-D DCT/weighting of sum information}} \right\}$$

horizonta 8-point 1-D DCT/weighting

This second set of equations indicate that it is also mathematically equivalent to perform a 4-point 1-D DCT/weighting process first on the vertical coordinates and use the result as input to an 8-point 1-D OCT/weighting process performed on the horizontal coordinates.

All 8-point 1-D OCT/weighting processes mentioned above are of the type described in U.S. patent application No. 08/961,328 to Chang et al., filed on Nov. 14, 1997, entitled "Method and System for Improved Digital Video Data Processing Using 8-point Discrete Cosine Transforms", the contents of which are hereby incorporated by reference. The 1-D 4-point DCT/weighting process is disclosed in the present invention.

In 2-4-8 DCT mode, the combined DCT/weighting process is also performed twice, once on the 4×8 block of sum information and once on the 4×8 block of difference information. For each block, pixel value components referred to above as P(x,y) are processed twice by processors executing the combined DCT/weighting process, once performing a 4-point DCT/weighting process on the vertical y-coordinates and once performing an 8-point DCT/weighting process on the horizontal y-coordinates. As mentioned earlier, the order in which the two transforms are performed is immaterial. The present invention will be described by performing a 4-point DCT/weighting process followed by an 8-point DCT/weighting process on the sum information.

Figure 3:
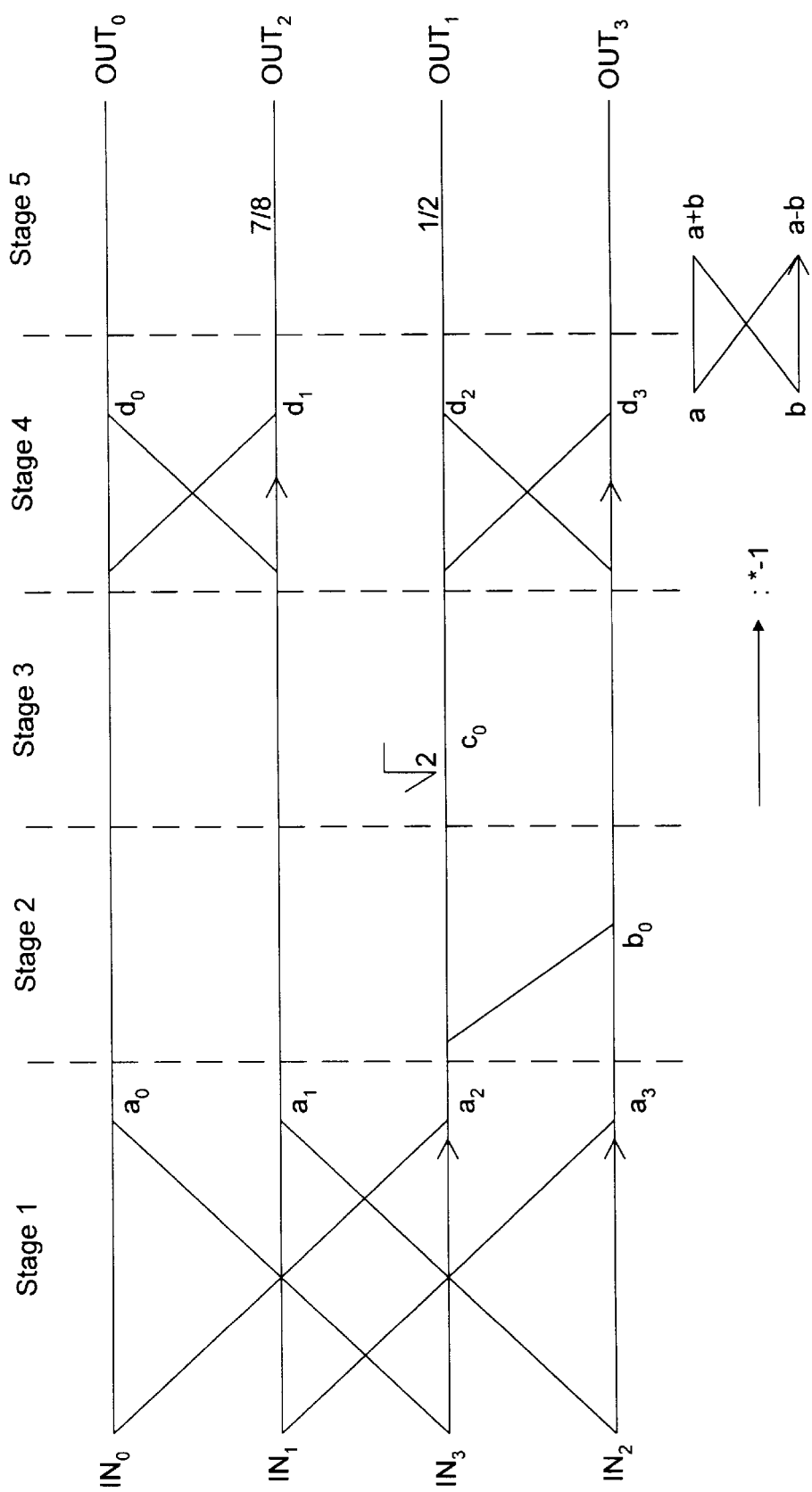
FIG. 3 is a flow diagram illustrating in detail a one-dimensional combined discrete cosine transformation/weighting (DCTIW) process consistent with the present invention.

FIG. 3 is a diagram also known as a "butterfly diagram". FIG. 3 shows the 1-D 4-point combined DCT/weighting process of the present invention as a five-stage pipeline converting four inputs $I_0$–$I_3$ to four outputs $O_0$–$O_3$. In the diagram, input data flows from left to right. A diagonal line connecting two inputs indicates that the inputs are added together. An arrowhead indicates that the additive inverse of the result at the point of the arrow head is computed before the next calculation. A constant placed above a line segment indicates that the result at the left end of the line segment is multiplied by the indicated constant.

The transformation process begins with four inputs representing the vertical sum information of the pixel components of P(x,y). In stage one, the four inputs $I_0$–$I_3$ are combined pairwise, as shown in FIG. 3, to obtain first intermediate values $a_0$–$a_3$. Combinations are performed using addition and subtraction (or addition by the additive inverse). In stage two, a subset of the first intermediate values are combined to obtain second intermediate value $b_0$. In the stage three, intermediate value $a_2$ is multiplied by a constant to obtain a third intermediate value $c_0$. In stage four, a subset of the previously determined first, second, and third intermediate values is pairwise combined to obtain fourth intermediate values, $d_0$–$d_3$. In stage five, intermediate values $d_1$ and $d_2$ are multiplied by constants or shifted to obtain four output values, $O_0$–$O_3$. The output values are then used as input to the 8-point 1-D DCT/weighting transform on the horizontal components. The 8-point 1-D DCT/weighting transform is described more completely in the abovementioned patent.

Following execution of the 8-point DCT/weighting process, the input 4×8 matrix of sum information is a matrix of coefficients, each coefficient representing a weighting of that portion of the total image. Next, a 4-point DCT/weighting process followed by an 8-point DCT/weighting process is performed on the 4×8 matrix of difference information to obtain a second 4×8 matrix of coefficients.

The implementation of the 1-D 4-point DCT/weighting process shown in FIG. 3 only requires two multiplications and one shift operation. Furthermore, the calculations in the butterfly diagram of FIG. 3 can be scaled without changing the present invention. In particular, a scaling factor can be applied to any stage provided that it is consistently applied so as to preserve the mathematical relationship between the output data.

B. Decompression

In decompression, the IDCT may be combined with an inverse weighting function in a manner that is basically an inverse of the compression process. First, the coefficient information is subjected to an inverse weighting process. If Q(h,v) represents weighted coefficient information, then the inverse weighting process may be described mathematically as follows:

$$Q'(h, v) = W'(h,v)Q(h,v)$$

where Q(h,v) represents the input to the inverse weighting function and Q'(h,v) is the output of the inverse weighting function.

The weights used in the inverse process of the DV format are the same as those used in the compression process described earlier, namely:

$$W'(h, v) = \begin{cases} 4 & h = 0, v = 0 \\ 2/(w(h)w(2v)), & v < 4 \\ 2/(w(h)w(2(v-4))), & 4 \le v < 7 \end{cases}$$

ere w (0)=1
  w (1)=CS4/ (4×CS7 x CS2)
  w (2)=CS4/ (2×CS6)
  w (3)=1/(2×CS5)
  w (4)=⅞
  w (5)=CS4/CS3
  w (6)=CS4/CS2
  w (7)=CS4/CS1
  and CSm=COS (mII/16).

Additionally, the mathematical representation for the standard 2A4-8 IDCT equation for DV format is as follows:
If y=2m, then for m=0, 1, 2, 3, and x=0, 1, . . . 7.

$$P(x, y) = P(x, 2m) = \sum_{v=0}^{3}\sum_{h=0}^{7}(C(v)C(h)(Q'(h, v) + Q'(h, v+4))\cos\left(\frac{\pi v(2m+1)}{8}\right)\cos\left(\frac{\pi h(2x+1)}{16}\right))$$

Also, if y=2m+1, for m=0, 1, 2, 3, and x=0, 1, . . . , 7, $$P(x, y) = P(x, 2m+1) = \sum_{v=0}^{3}\sum_{h=0}^{7}(C(v)C(h)(Q'(h, v) - Q'(h, v+4))\cos\left(\frac{\pi v(2m+1)}{8}\right)\cos\left(\frac{\pi h(2x+1)}{16}\right))$$

where Q'(h, v) is the output of the inverse weighting function and is used as input to the IDCT. In the equation above, the output P(x,y) consists of pixel information representing the decoded image. Also, in the equation above, $$C(h) = \begin{cases} \frac{1}{2\sqrt{2}}, & h = 0 \\ \frac{1}{2}, & h = 1 \text{ to } 7 \end{cases} \text{ and}$$

$$C(v) = \begin{cases} \frac{1}{2\sqrt{2}}, & v = 0 \\ \frac{1}{2}, & v = 1 \text{ to } 7 \end{cases}$$

To combine the inverse weighting function and the IDCT, first substitute

W'(h, v) Q (h, v) for Q'(h, v) in the IDCT equation. The result is a formula describing a combined inverse weighting/DCT process.

$$P(x, y) = \sum_{v=0}^{3}\sum_{h=0}^{7}(C(v)C(h)(Q'(h, v) + (-1)^y Q'(h, v+4))\cos\left(\frac{\pi v(2 \cdot INT(y/2) + 1)}{8}\right)\cos\left(\frac{\pi h(2x+1)}{16}\right))$$

$$P(x, y) = \sum_{v=0}^{3}\sum_{h=0}^{7}(C(v)C(h)(W(h, v) + (-1)^y W'(h, v+4)) Q(h, v+4)\cos\left(\frac{\pi v(2 \cdot INT(y/2) + 1)}{8}\right)\cos\left(\frac{\pi h(2x+1)}{16}\right))$$

Next, define $$Q''(h, v) = \begin{cases} 2Q(h, v) & h = 0, v = 0 \\ Q(h, v) & \text{others} \end{cases}$$

where Q (h,v) is the input to the combined IW/IDCT process and Q" (h,v) is an intermediate representation. After substituting for Q(h,v), the result is:

$$P(x, y) = \sum_{v=0}^{3}\sum_{h=0}^{7}\left(C(v)C(h)\frac{2}{w(h)w(2v)}(Q''(h, v) + (-1)^y \cdot Q''(h, v+4))\cos\left(\frac{\pi v(2 \cdot INT(y/2)+1)}{8}\right)\cos\left(\frac{\pi h(2x+1)}{16}\right)\right)$$

$$P(x, y) = P(x, 2m) = \frac{1}{4}\sum_{h=0}^{7}\left\{\frac{C'(h)}{w(h)}\cos\left(\frac{\pi h(2x+1)}{16}\right)\underbrace{\left[\sum_{v=0}^{3}\frac{C'(v)}{w(2v)}\cos\left(\frac{\pi h(2m+1)}{8}\right)(Q''(h, v) + Q''(h, v+4))\right]}_{\text{vertical 1-D 4-point inverse weighting/IDCT}}\right\}$$

$\text{horizontal 1-D 8-point inverse weighting/IDCT}$ if $y = 2m+1$, $m = 0, 1, \ldots 3$, and $x = 0, 1, \ldots 7$, $$P(x, y) = P(x, 2m+1) = \frac{1}{4}\sum_{h=0}^{7}\left\{\frac{C'(h)}{w(h)}\cos\left(\frac{\pi v(2x+1)}{16}\right)\underbrace{\left[\sum_{v=0}^{3}\frac{C'(v)}{w(2v)}\cos\left(\frac{\pi h(2m+1)}{8}\right)(Q''(h, v) - Q''(h, v+4))\right]}_{\text{vertical 1-D 4-point inverse weighting/IDCT}}\right\}$$

$\text{horizontal 1-D 8-point inverse weighting/IDCT}$

Next define $$C'(h) = 2\sqrt{2}\, C(h) = \begin{cases} 1, & h = 0 \\ \sqrt{2}, & h = 1 \text{ to } 7 \end{cases} \text{ and}$$

$$C'(v) = \begin{cases} 1, & v = 0 \\ \sqrt{2}, & v = 1 \text{ to } 7 \end{cases}$$

After substituting again, the equation for the combined IDCT/IW process of the present invention is as follows, where $Q''(h,v)$ is the intermediate representation and $P(x,y)$ is the desired pixel information.

$$P(x, y) = \sum_{v=0}^{3}\sum_{h=0}^{7}\left(\frac{1}{4} \cdot \frac{C'(h)C'(v)}{w(h)w(2v)}(Q''(h, v) + (-1)^y \cdot Q''(h, v+4))\cos\left(\frac{\pi v(2 \cdot INT(y/2)+1)}{8}\right)\cos\left(\frac{\pi h(2x+1)}{16}\right)\right)$$

If $y=2m$, $m=0, 1, \ldots 3$, and $x=0, 1, \ldots 7$, then $$P(x, y) = P(x, 2m) = \frac{1}{4}\sum_{v=0}^{3}\left\{\frac{C'(v)}{w(2v)}\cos\left(\frac{\pi v(2m+1)}{8}\right)\underbrace{\left[\sum_{h=0}^{7}\frac{C'(h)}{w(h)}\cos\left(\frac{\pi h(2x+1)}{16}\right)(Q''(h, v) + Q''(h, v+4))\right]}_{\text{horizontal 1-D 8-point inverse weighting/IDCT}}\right\}$$

$\text{vertical 1-D 4-point inverse weighting/IDCT}$ if $y = 2m+1$, $m = 0, 1, \ldots 3$, and $x = 0, 1, \ldots 7$, then $$P(x, y) = P(x, 2m+1) = \frac{1}{4}\sum_{v=0}^{3}\left\{\frac{C'(v)}{w(2v)}\cos\left(\frac{\pi v(2m+1)}{8}\right)\underbrace{\left[\sum_{h=0}^{7}\frac{C'(h)}{w(h)}\cos\left(\frac{\pi h(2x+1)}{16}\right)(Q''(h, v) - Q''(h, v+4))\right]}_{\text{horizontal 1-D 8-point inverse weighting/IDCT}}\right\}$$

$\text{vertical 1-D 4-point inverse weighting/IDCT}$

The result is a formula for the combination of the inverse weighting function and the two-dimensional lDCT. As indicated above, the two-dimensional IW/IDCT can be separated into two 1-D transforms. In the equation above, an 8-point 1-D inverse weighting/lDCT process is performed first on the horizontal coordinates. The result is then used as input to the 4-point I-D inverse weighting/IDCT process on the vertical coordinates.

Alternatively, Q"(h,v) may be factored as follows:

If $y=2m$, $m=0, 1, \ldots 3$, and $x=0, 1, \ldots 7$,

The equation above indicates that it is also mathematically equivalent to perform the 4-point 1-D inverse weighting/I DCT process on the vertical coordinates first and use the result as input to the 8-point 1- transform on the horizontal coordinates. All 8point 1-D combined inverse weighting/ICDT processes mentioned above are of the type described in U.S. patent application No. 08/971,329, to Chang et al., filed on Nov. 14, 1997, entitled "Method and System for Improved Digital Video Data Processing Using 8-point Discrete Cosine Transforms", the contents of which are hereby expressly incorporated by reference. The 4-point 1-D inverse weighting/lDCT process is disclosed in the present invention.

In 2-4-8 DCT mode, the combined inverse weighting/IDCT process is performed twice, once to obtain the 4×8 block of information of the even rows and once to obtain the 4×8 block of information of odd rows. Each combined inverse weighting/IDCT process involves performing a 4-point 1-D inverse weighting/lDCT process and an 8point 1-D inverse weighting/IDCT process. The order in which the two transforms are performed on each block is immaterial. For sake of this explanation, the present invention will be described by performing the 4-point 1-D inverse weighting/ IDCT process followed by the 8-point 1-D inverse weighting/IDCT process.

Figure 4:
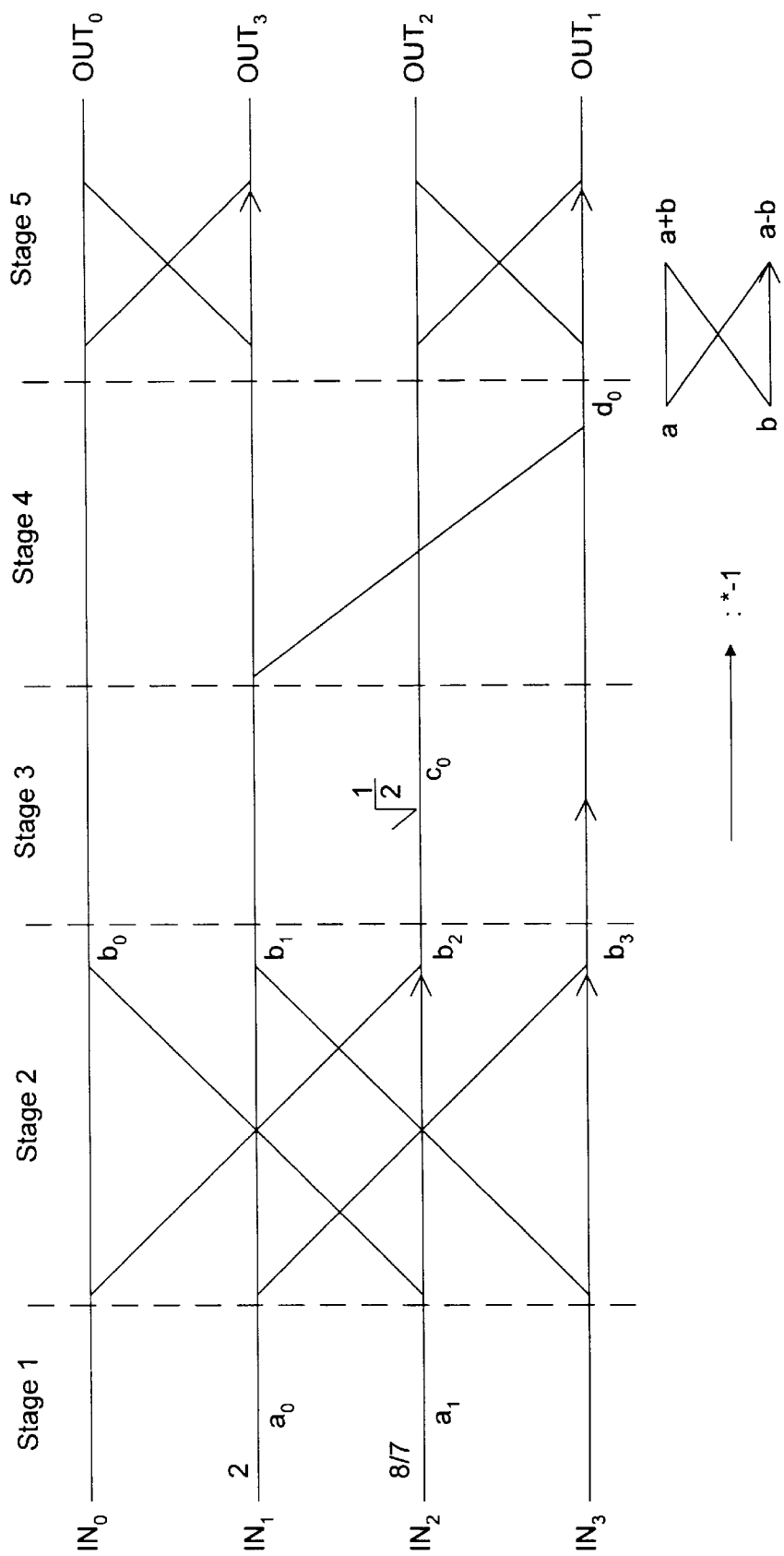
FIG. 4 is a flow diagram illustrating in detail a one-dimensional combined inverse weighting/inverse discrete cosine transformation (IW/IDCT) process consistent with the present invention.

FIG. 4 illustrates a 4-point 1-D combined inverse weighting/IDCT process consistent with the present invention. The combined inverse weighting/IDCT process may be implemented as a five-stage pipeline as depicted by the butterfly diagram of FIG. 4.

The transformation process begins with four inputs $I_0$–$I_3$ representing the information of the even rows. These four inputs $I_0$–$I_3$ are obtained by adding the sum coefficients Q"(h,v) and the difference coefficients Q"(h, v+4). In stage one, the four inputs are either multiplied by constants or shifted to obtain first intermediate values, $a_0$ and $a_1$. In stage two, combinations are performed on a subset of the input components and the first intermediate values using addition and subtraction (or addition by the additive inverse) to obtain intermediate values, $b_0$–$b_3$. In stage three, intermediate value $b_2$ is multiplied by a constant to obtain a third intermediate value, $c_0$. In stage four, a pair of previously determined intermediate values are combined to obtain a fourth intermediate value, $d_0$. Stage five consists of multiple pairwise combinations of previously obtained intermediate values resulting in four output values $O_0$–$O_3$. The output values are then used as input to an 8-point 1-D inverse weighting/IDCT transform.

Following execution of the 8-point transform, the result is a 4×8 matrix of the even rows of pixel information. The process is repeated to obtain a second 4×8 matrix of the odd rows of the pixel information by using Q"(h, v)—Q"(h, v+4) as inputs. The combined inverse weighting/IDCT function as implemented in FIG. 4 requires only two multiplications and one shift operation. The calculations in the butterfly diagram of FIG. 4 can be scaled without changing the present invention. The scaling factor can be applied to any stage so long as it is consistently applied so as to preserve the mathematical relationship between the output data.

Figure 5:
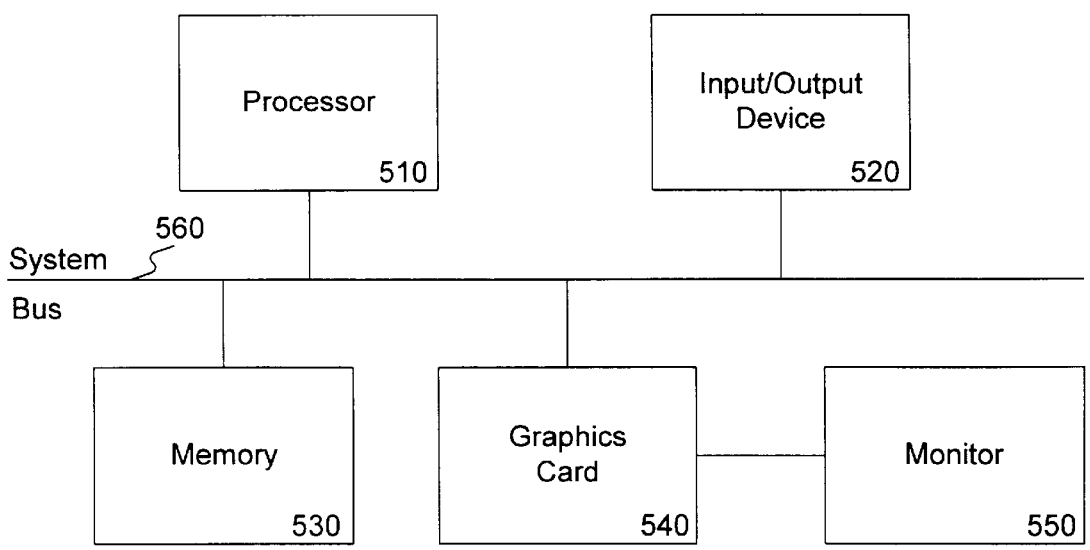
FIG. 5 shows a system for carrying out a method consistent with the present invention.

FIG. 5 illustrates a system consistent with the present invention. As shown in FIG. 5, a processor 510 is connected to at least one input/output (I/O) device 520 via any suitable data connection. I/O device 520 can be any device capable of passing information to or receiving data from processor 510. By way of example only, I/O device 520 may be a digital camcoder connected through IEEE 1394 interface. Processor 510 may be any commonly available processor such as, for example, a Pentium. Faster processors, however, will decrease execution time of the invention.

The system of the present invention also includes memory 530 and graphics card 540. Memory 530 stores the data being processed by processor 510 and the data being sent to or received from I/O device 520. Graphics card 540 converts the display image into a signal that can be received by display monitor 550. Processor 510, I/O device 520, memory 530, graphics card 540 and monitor 550 are connected via a standard system bus 560. FIG. 5 shows an exemplary network where each hardware component may be implemented by conventional, commercially available computer systems components.

Figure 6:
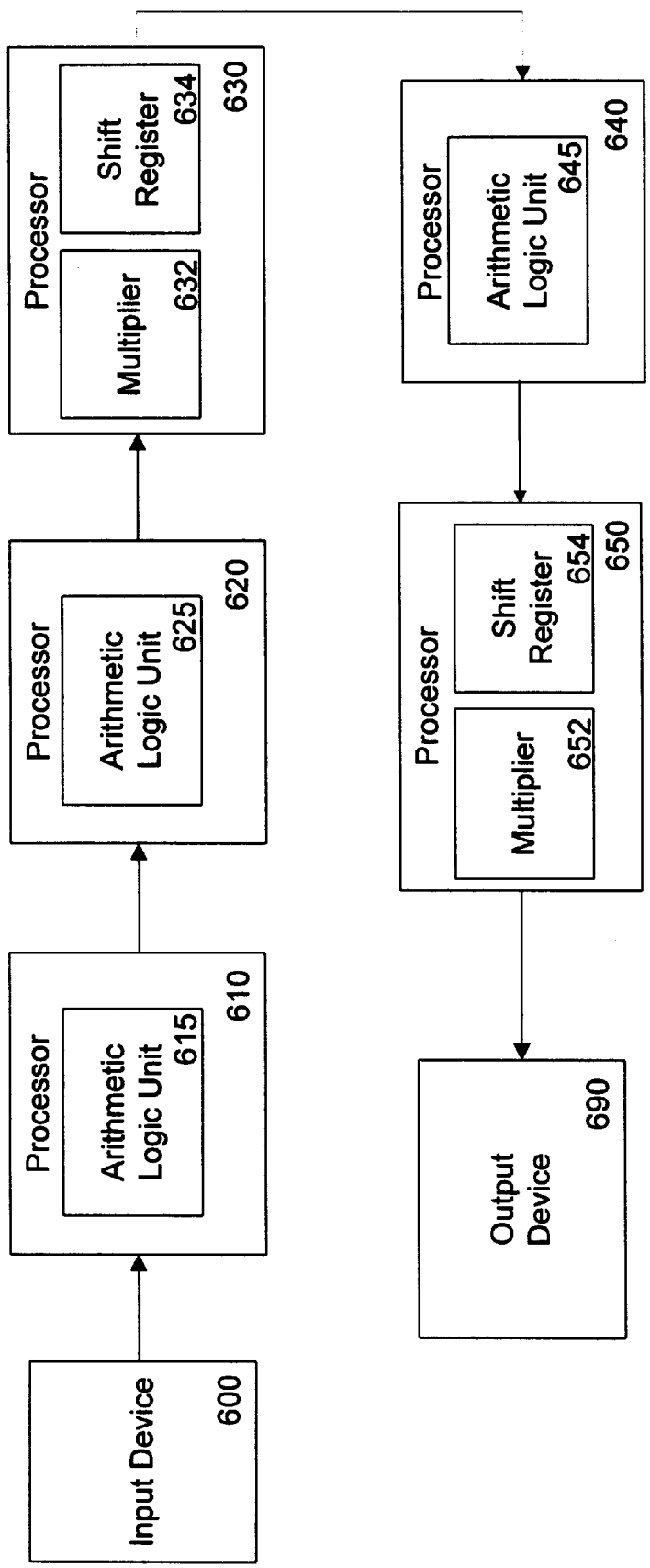
FIG. 6 shows a five processor data compression system consistent with the present invention.

Moreover, a data compression system consistent with the present invention may be implemented as five high-speed custom hardware processors 610, 620, 630, 640 and 650 as shown in FIG. 6. Each processor 610–650 performs operations corresponding to one of the stages in FIG. 3. Processors 610, 620 and 640 contain at least one arithmetic logic unit (ALU). ALUs 615, 625, and 645 are processors capable of performing arithmetic and logical operations. Processors 630 and 650 each contain at least one multiplier 632 and 652 and at least one shift register 634 and 654. The system of FIG. 6 also comprises an input device 600 and an output device 690.

Figure 7:
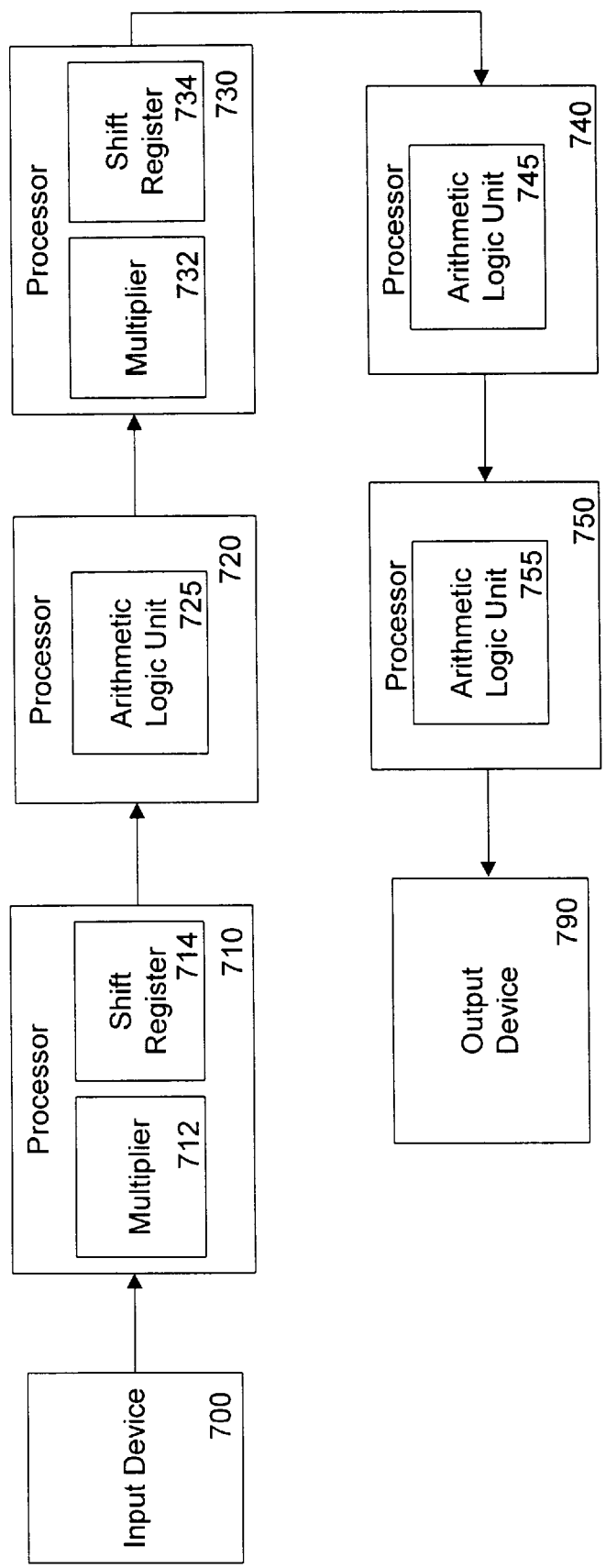
FIG. 7 shows a five processor data decompression system consistent with the present invention.

Furthermore, as shown in FIG. 7, a data decompression system consistent with the present invention may be implemented using an input device 700, output device, 790, and five high-speed custom hardware processors 710, 720, 730, 740 and 750. Processors 720, 740 and 750 contain at least one arithmetic logic unit (ALU). ALUs 725, 745, and 755 are processors capable of performing arithmetic and logical operations. Processors 710 and 730 each contain at least one multiplier 712 and 732 and at least one shift register 714 and 734. Each processor 710–750 performs operations corresponding to one of the stages in FIG. 4.

Methods and apparatus consistent with the present invention may be implemented in software, hardware, or a combination of hardware and software. Software implementations of the invention are preferably embodied in a computer-readable media, such as a magnetic disk, or transferred over computer-readable media, such as the Internet.

It will be apparent to those skilled in the art that various modifications and variations can be made in the methods and systems consistent with the present invention without departing from the spirit or scope of the invention. For example, if a scaling factor is consistently applied throughout the butterfly diagrams, the result would be a scaled version of the present invention and would be functionally equivalent. The true scope of the claims is defined by the following claims.

What is claimed is:

1. A method for performing data compression in a digital video encoder, wherein the discrete cosine transform and weighting functions are combined, the method comprising the steps performed by a processor of:

receiving a plurality of input components representing pixel components of an image;

determining a first group of intermediate values by combining subsets of the input components;

determining a second group of intermediate values by combining a first subset of the input components and the first group of intermediate values;

determining a third group of intermediate values by combining a second subset of the input components and the first and second groups of intermediate values with a first set of predetermined constants, each predetermined constant being a function of discrete cosine coefficients and digital video weighting constants;

determining a fourth group of intermediate values by combining a third subset of the input components and the first, second, and third groups of intermediate values;

determining output components by combining a fourth subset of the input components and the first, second, third, and fourth groups of intermediate values with a second set of predetermined constants, each predetermined constant being a function of discrete cosine coefficients and digital video weighting constants; and, outputting output components representing weighted, compressed digital representations of an image.

2. The method of claim 1, wherein the step of determining a first group of intermediate values comprises the step of combining using an arithmetic function.

3. The method of claim 1, wherein the step of determining a second group of intermediate values comprises the step of combining using an arithmetic function.

4. The method of claim 1, wherein the step of determining a third group of intermediate values comprises the steps of:

multiplying a first subset of the input components and the first and second groups of intermediate values with the first set of predetermined constants; and, shifting a second subset of the input components and the first and second groups of intermediate values.

5. The method of claim 4, wherein the first set of predetermined constants comprises √2 and its multiples.

6. The method of claim 1, wherein the step of determining a fourth group of intermediate values comprises the step of combining using an arithmetic function.

7. The method of claim 1, wherein the step of determining output components comprises the steps of:

multiplying a first subset of the input components and the first, second, third; and fourth groups of intermediate values with the second set of predetermined constants; and, shifting a second subset of the input components and the first, second, third, and fourth groups of intermediate values.

8. The method of claim 7, wherein the second set of predetermined constants comprises ⅞ and its multiples.

9. A method for performing data compression in a digital video encoder, wherein the discrete cosine transform and weighting functions are combined, the method comprising the steps performed by a processor of:

receiving four input values $I_0$–$I_3$ representing digital samples of an image;

determining a first intermediate value $a_0$ equal to $I_0+I_3$;

determining a first intermediate value $a_1$ equal to $I_1+I_2$;

determining a first intermediate value $a_2$ equal to $I_0-I_3$;

determining a first intermediate value $a_3$ equal to $I_1-I_2$;

determining a second intermediate value $b_0$ equal to $a_2+a_3$;

determining a third intermediate value $c_0$ by multiplying $a_2$ by the constant $\sqrt{2}$;

determining a fourth intermediate value $d_0$ equal to $a_0+a_1$;

determining a fourth intermediate value $d_1$ equal to $a_0-a_1$;

determining a fourth intermediate value $d_2$ equal to $c_0+b_0$;

determining a fourth intermediate value $d_3$ equal to $c_0-b_0$;

determining an output $O_0$ equal to $d_0$;

determining an output $O_1$ by shifting $d_2$;

determining an output $O_2$ by multiplying $d_1$ by the constant ⅞;

determining an output $O_3$ equal to $d_3$; and, outputting outputs $O_0$–$O_3$ representing weighted, compressed digital representations of an image.

10. A data compression system for performing data compression in a digital video encoder, wherein the discrete cosine transform and weighting functions are combined, the system comprising:

an input device for receiving a plurality of input components representing pixel information of an image;

a first processor for determining a first group of intermediate values by combining subsets of the input components;

a second processor for determining a second group of intermediate values by combining a first subset of the input components and the first group of intermediate values;

a third processor for determining a third group of intermediate values by combining a second subset of the input components and the first and second groups of intermediate values with a first set of predetermined constants, each predetermined constant being a function of discrete cosine coefficients and digital video weighting constants;

a fourth processor for determining a fourth group of intermediate values by combining a third subset of the input components and the first, second, and third groups of intermediate values;

a fifth processor for determining output components by combining a fourth subset of the input components and the first, second, third, and fourth groups of intermediate values with a second set of predetermined constants, each predetermined constant being a function of discrete cosine coefficients and digital video weighting constants; and, an output device for outputting the output components as weighted, compressed digital representations of an image.

11. The system of claim 10, wherein the first processor comprises at least one component performing arithmetic/logical functions.

12. The system of claim 10, wherein the second processor comprises at least one component performing arithmetic/logical functions.

13. The system of claim 10, wherein the third processor the comprises:

a multiplier for multiplying a first subset of input components and the first and second groups of intermediate values with the first set of predetermined constants, each predetermined constant being a function of discrete cosine coefficients and digital video weighting constants; and, a shift register for shifting a second subset of the input components and the first and second groups of intermediate values.

14. The system of claim 13, wherein the first set of predetermined constant comprises √2 and its multiples.

15. The system of claim 10, wherein the fourth processor comprises at least one component performing arithmetic/logical functions.

16. The system of claim 10, wherein the fifth processor the comprises:

a multiplier for multiplying a first subset of input components and the first, second, third and fourth groups of intermediate values with the second set of predetermined constants, each predetermined constant being a function of discrete cosine coefficients and digital video weighting constants; and, a shift register for shifting a second subset of the input components and the intermediate values.

17. The system of claim 16, wherein the second set of predetermined constants comprises ⅞ and its multiples.

18. A system for performing data compression in a digital video encoder, wherein the discrete cosine transform and weighting functions are combines, the system comprising:

an input device for receiving four input values, 10-13 representing pixel components of an image;

a processor for performing the following determinations:

receiving four input values $I_0$–$I_3$ representing digital samples of an image;

determining a first intermediate value $a_0$ equal to $I_0+I_3$;

determining a first intermediate value $a_1$ equal to $I_1+I_2$;

determining a first intermediate value $a_2$ equal to $I_0-I_3$;

determining a first intermediate value $a_3$ equal to $I_1-I_2$;

determining a second intermediate value $b_0$ equal to $a_2+a_3$;

determining a third intermediate value $c_0$ by multiplying $a_2$ by the constant $\sqrt{2}$;

determining a fourth intermediate value $d_0$ equal to $a_0+a_1$;

determining a fourth intermediate value $d_1$ equal to $a_0-a_1$;

determining a fourth intermediate value $d_2$ equal to $c_0+b_0$;

determining a fourth intermediate value d3 equal to $c_0-b_0$;

determining an output $O_0$ equal to $d_0$;

determining an output $O_1$ by shifting $d_2$;

determining an output $O_2$ by multiplying $d_1$ by the constant $7/8$; and, determining an output $O_3$ equal to $d_3$; and, an output device for outputting $O_0$–$O_3$ representing weighted, compressed digital representations of an image.

19. A method for performing data decompression in a digital video decoder, wherein the inverse discrete cosine transform and weighting functions are combined, the method comprising the steps performed by a processor of:

receiving a plurality of input components representing weighted, compressed digital representations of an image;

determining a first group of intermediate values by combining a subset of the input components with a first set of predetermined constants, each predetermined constant being a function of discrete cosine coefficients and digital video weighting constants;

determining a second group of intermediate values by combining a first subset of the input components and the first group of intermediate values;

determining a third group of intermediate values by combining a second subset of the input components and the first and second groups of intermediate [value] values with a second set of predetermined constants, each predetermined constant being a function of discrete cosine coefficients and digital video weighting constants;

determining a fourth group of intermediate values by combining a third subset of the input components and the intermediate values;

determining output components by combining a fourth subset of the input components and the intermediate values; and, outputting output components representing pixel information of an image.

20. The method of claim 19, wherein the step of determining a first group of intermediate values comprises the steps of:

multiplying a first subset of the input components with the first set of predetermined constants; and, shifting a second subset of the input components.

21. The method of claim 20, wherein the first set of predetermined constants comprises $8/7$ and its multiples.

22. The method of claim 19, wherein the step of determining a second group of intermediate values comprises the step of combining using an arithmetic function.

23. The method of claim 19, wherein the step of determining a third group of intermediate values comprises the steps of:

multiplying a first subset of the input components and the first and second groups of intermediate values with the second set of predetermined constants; and, shifting a second subset of the input components and the first and second groups of intermediate values.

24. The method of claim 23 wherein the second set of predetermined constants comprises $1/\sqrt{2}$ and its multiples.

25. The method of claim 1 9, wherein the step of determining a fourth group of intermediate values comprises the step of combining using an arithmetic function.

26. The method of claim 19, wherein the step of determining output components comprises the step of combining using an arithmetic function.

27. A method for performing data decompression in a digital video decoder, wherein the inverse discrete cosine transform and weighting functions are combined, the method comprisings performed by a processor of:

receiving four input values $I_0$–$I_3$ representing weighted, compressed digital representations of an image;

determining a first intermediate value $a_0$ by shifting $l_1$;

determining a first intermediate value $a_1$ by multiplying $a_0$ by the constant $8/7$;

determining a second intermediate value $b_0$ equal to $I_0+a_1$;

determining a second intermediate value $b_1$ equal to $a_0+I_3$;

determining a second intermediate value $b_2$ equal to $I_0-a_1$;

determining a second intermediate value b3 equal to $a_0-I_3$;

determining a third intermediate value $c_0$ by multiplying $b_2$ by the constant $1/\sqrt{2}$;

determining a fourth intermediate value $d_0$ equal to $b_1-b_3$;

determining an output $O_0$ equal to $b_0+b_1$;

determining an output $O_3$ equal to $b_0-b_1$;

determining an output $O_2$ equal to $c_0+d_0$;

determining an output $O_3$ equal to $c_0-d_0$;

combining outputs $O_0$ through $O_3$ to form decompressed pixel information of an image.

28. A data decompression system for performing data decompression in a digital video decoder, wherein the inverse discrete cosine transform and weighting functions are combined, the system comprising:

an input device for receiving a plurality of input components representing weighted, compressed digital samples of an image;

a first processor for determining a first group of intermediate values by combining a subset of the input components with a first set of predetermined constants, each predetermined constant being a function of discrete cosine coefficients and digital video weighting constants;

a second processor for determining a second group of intermediate values by combining a first subset of the input components and the first group of intermediate values;

a third processor for determining a third group of intermediate values by combining a second subset of the input components and the first and second groups of intermediate values with a second set of predetermined constants, each predetermined constant being a function of discrete cosine coefficients and digital video weighting constants;

a fourth processor for determining a fourth group of intermediate values by combining a third subset of the input components and the first, second, and third groups of intermediate values;

a fifth processor for determining output components by combining a fourth subset of the input components and the first, second, third, and fourth groups of intermediate values; and, an output device for outputting the output components representing decompressed pixel components of an image.

29. The system of claim 28, wherein the first processor comprises:

a multiplier for multiplying a first subset of input components with the first set of predetermined constants; and, a shift register for shifting a second subset of the input components and the intermediate values.

30. The system of claim 29, wherein the first set of predetermined constants comprises $8/7$ and its multiples.

31. The system of claim 28, wherein the second processor comprises at least one component performing arithmetic/logical functions.

32. The system of claim 28, wherein the third processor comprises:

a multiplier for multiplying a first subset of input components and the first and second groups of intermediate values with the second set of predetermined constants; and, a shift register for shifting a second subset of the input components and the first and second groups of intermediate values.

33. The system of claim 32, wherein the second set of predetermined constants comprises $1/\sqrt{2}$ and its multiples.

34. The system of claim 28, wherein the fourth processor comprises at least one component performing arithmetic/logical functions.

35. The system of claim 28, wherein the fifth processor comprises at least one component performing arithmetic/logical functions.

36. A system for performing data decompression in a digital video decoder, wherein the inverse discrete cosine transform and weighting functions are combined, the system comprising:

an input device for receiving four input values, $I_0$–$I_3$ representing weighted, compressed digital representations of an image;

a processor for performing the following determinations:
    determining a first intermediate value $a_0$ by shifting $I_1$;
    determining a first intermediate value $a_1$ by multiplying ad by the constant $8/7$;
    determining a second intermediate value $b_0$ equal to $I_0 + a_1$;
    determining a second intermediate value $b_1$ equal to $a_0 + I_3$;
    determining a second intermediate value $b_2$ equal to $I_0 a_1$;
    determining a second intermediate value $b_3$ equal to $a_0 - I_3$;
    determining a third intermediate value $c_0$ by multiplying $b_2$ by the constant $1/\sqrt{2}$;
    determining a fourth intermediate value $d_0$ equal to $b_1 - b_3$;
    determining an output $O_0$ equal to $b_0 + b_1$;
    determining an output $O_3$ equal to $b_1 - b_1$;
    determining an output $O_2$ equal to $c_0 + d_0$;
    determining an output $O_3$ equal to $c_0 - d_0$;

providing the outputs, $O_0$–$O_7$, representing the decompressed pixel components of an image.

* * * * *

UNITED STATES PATENT AND TRADEMARK OFFICE
CERTIFICATE OF CORRECTION

PATENT NO. : 6,215,909 B1
DATED : April 10, 2001
INVENTOR(S) : Ching-Fang Chang et al.

It is certified that error appears in the above-identified patent and that said Letters Patent is hereby corrected as shown below:

Title page,
Item [75], and Column 1, line 2,
Under "Inventors", after "Fremont", insert -- , both of CA (US) --;
Line 3, delete "all of".

Column 17, claim 7,
Line 16, "third;" should read -- third, --.

Column 18, claim 13, and Column 18, claim 16, line 43,
Line 26, "the comprises:" should read -- comprises: --.

Column 18, claim 18,
Line 56, "combines" should read -- combined --;
Line 57, "10-13" should read -- $l_0$-$l_3$ --;

Column 19,
Line 9, "d3" should read -- $d_3$ --.

Claim 19,
Line 37, delete "[value]".

Column 20, claim 25,
Line 5, "1 9" should read -- 19 --.

Column 20, claim 27,
Line 25, "b3" should read -- $b_3$ --;
Line 28, "$b_2$by" should read -- $b_2$ by --.

UNITED STATES PATENT AND TRADEMARK OFFICE
CERTIFICATE OF CORRECTION

PATENT NO. : 6,215,909 B1
DATED : April 10, 2001
INVENTOR(S) : Ching-Fang Chang, et al.

It is certified that error appears in the above-identified patent and that said Letters Patent is hereby corrected as shown below:

<u>Column 22, claim 36,</u>
Line 13, "ad" should read -- $a_0$ --;
Line 17, "$1_3$" should read -- $I_3$ --;
Line 19, "$I_0a_1$" should read -- $I_0$-$a_1$ --;
Line 28, "$b_1$-$b_1$" should read -- $b_0$-$b_1$ --.

Signed and Sealed this

Twentieth Day of November, 2001

Attest:

NICHOLAS P. GODICI
Attesting Officer
*Acting Director of the United States Patent and Trademark Office*